United States Patent [19]
Hamilton, II
[11] 3,784,848
[45] Jan. 8, 1974

[54] DETECTOR CIRCUIT WITH AUTOMATIC SENSITIVITY CONTROL AND POST DETECTION FILTERING FOR TOUCH CONTROL CIRCUITRY

[76] Inventor: William F. Hamilton, II, 1528 C. Miramar Beach, Santa Barbara, Calif. 93108

[22] Filed: June 22, 1972

[21] Appl. No.: 265,311

[52] U.S. Cl. .................. 307/308, 328/162, 329/178, 331/65

[51] Int. Cl. ............................ H04f 1/10, H03d 1/20

[58] Field of Search .................... 329/178, 179, 150, 329/153, 154; 331/65; 332/38, 37 R, 37 D; 328/175, 192, 162; 307/235 A, 308; 325/408–414, 422, 423

[56] References Cited

UNITED STATES PATENTS

| | | | |
|---|---|---|---|
| 3,571,627 | 3/1971 | Cardon | 328/175 X |
| 3,162,801 | 12/1964 | Bogotch et al. | 325/408 X |
| 2,866,892 | 12/1958 | Barton | 329/179 X |
| 3,697,781 | 10/1972 | McLean | 307/235 A |
| 3,387,221 | 6/1968 | Arberman et al. | 329/178 X |

*Primary Examiner*—Alfred L. Brody
*Attorney*—Marcus B. Finnegan et al.

[57] ABSTRACT

A detector circuit for use in connection with touch control circuitry incorporates automatic sensitivity control and post detection filtering. The detector circuit includes a touch receptor operable by electrical contact with a human body for producing an oscillating signal which increases in amplitude in response to a touch input, detecting means responsive to the oscillating signal for producing an output to indicate the increase in the amplitude of the oscillating signal, a feedback path including a low pass filter responsive to the output of the detecting means for controlling the sensitivity of the detecting means to the oscillating signal, and means responsive to the output of the detecting means for eliminating undesired frequency components from the output of the detecting means.

12 Claims, 7 Drawing Figures

DETECTOR CIRCUIT WITH AUTOMATIC SENSITIVITY CONTROL AND POST DETECTION FILTERING FOR TOUCH CONTROL CIRCUITRY

The present invention relates to a detector circuit for use with touch control circuitry and, more particularly, to a detector circuit incorporating both automatic sensitivity control and post detection filtering for use in connection with touch control circuitry.

In the art of touch controlled circuitry, a touch control switch (TCS), i.e., an electrical switch including a touch receptor operated by electrical contact with the human body, is used in place of conventional switches to accomplish desired control of an electrical device or circuit. Generally, there are two possible modes of operation for touch control switches: first, a mode in which circuitry internal to the switch is used to detect contact with the electrical capacitance of the human body and, second, a mode in which internal circuitry is activated by "hum pickup" of the body and is dependent on the presence of ordinary A-C power wiring for normal operation. In a hum pickup circuit, a touch input results in an abrupt and sustained increased in the amplitude of the hum pickup signal applied to the circuit. The present invention is specifically concerned with detector circuits for use in touch control circuitry operating on "hum pickup" principles.

In order to achieve commercially practical systems operable by TCS circuitry, the following requirements must be simultaneously fulfilled:

1. The TCS circuitry should be small, reliable, long-lived, and economical, both to acquire and to operate;
2. The TCS operation should be insensitive to stray electrical noise; and
3. The TCS touch receptors should be remote from the circuitry and locatable at a number of alternative locations.

The first requirement will be facilitated by the continuing development of solid electronics to make available higher performance, lower cost components and integrated circuits. The second requirement necessitates development of simple yet effective noise rejection circuitry. The third requirement is more complex to achieve, necessitating automatic sensitivity control; nonetheless, it is probably crucial to wide-spread TCS application because it potentially permits control of a power circuit to be accomplished from a number of locations at less total cost for switches and wiring than possible by conventional techniques. Simultaneous achievement of the second and third requirements by means compatible with the first requirement is the ultimate objective of the present invention.

In touch control installations including a plurality of remote operating locations for an electronic device, extended receptors and connectors between the remote locations and device exhibit substantial capacitance characteristics. As a result, such receptors and connectors may activate simple TCS circuits in the absence of contact with the human body. Moreover, where hum pickup is the activation mechanism, the signals picked up by the receptors and connectors will depend not only on the extent of the receptors and connectors, but on the proximity of power wiring as well. Furthermore, extended receptors and connectors considerably increase the pickup of electrical noise and the problem of noise rejection.

Consequently, a combination of automatic sensitivity adjustment and post detection filtering for the TCS circuitry is desirable. The TCS circuitry should automatically adjust its sensitivity for reliable operation with a wide range of attached connector and receptor arrangements in a variety of electrical ambiences. In addition, the TCS circuitry should incorporate post-detection filtering tailored to touch input signal characteristics to effectively eliminate noise and distinguish the signal induced by a touch input from the background hum signal. Post-detection filtering has the advantage of performing low-pass filtering with attenuation at frequencies above a few Hertz (Hz) to reject noise bursts while, in comparison, pre-detection filtering can only attenuate frequencies above 60 Hz because the circuitry must pass the hum carrier. In addition, post-detection filtering allows the isolation of a subsequent trigger circuit from very low frequency input signals resulting from general electrical ambience and the limited open-loop gain of the detector circuit. The present invention is specifically concerned with detector circuits for use in TCS circuitry to accomplish both automatic sensitivity control and post detection filtering.

In accordance with the present invention, a touch control switch circuit for detecting a touch input applied to the circuit comprises a touch receptor operable by electrical contact with a human body for producing an oscillating signal which increases in amplitude in response to a touch input applied to the receptor, detecting means responsive to the oscillating signal for producing an output to indicate the increase in the amplitude of the oscillating signal, a feedback path including a low pass filter responsive to the output of the detecting means for controlling the sensitivity of the detecting means to the oscillating signal, and means responsive to the output of the detecting means for eliminating undesired frequency components from the output of the detecting means.

In a preferred embodiment, the detecting means comprises a detector circuit and a variable gain amplifier having an input responsive to the oscillating signal and an output coupled to the detector circuit, and the feedback path is coupled to the amplifier to control the gain of the amplifier to decrease the sensitivity of the detecting means to the oscillating signal upon the occurrence of a protracted increase in its amplitude. In an alternative embodiment, the detecting means comprises a trigger circuit having a variable threshold and the feedback path is coupled to the trigger circuit to control the threshold of the trigger circuit to decrease the sensitivity of the trigger circuit to the oscillating signal upon the occurrence of a protracted increase in its amplitude.

The accompanying drawings illustrate preferred embodiments of the invention and, together with the description, serve to explain the principles of the invention.

Figure 3:
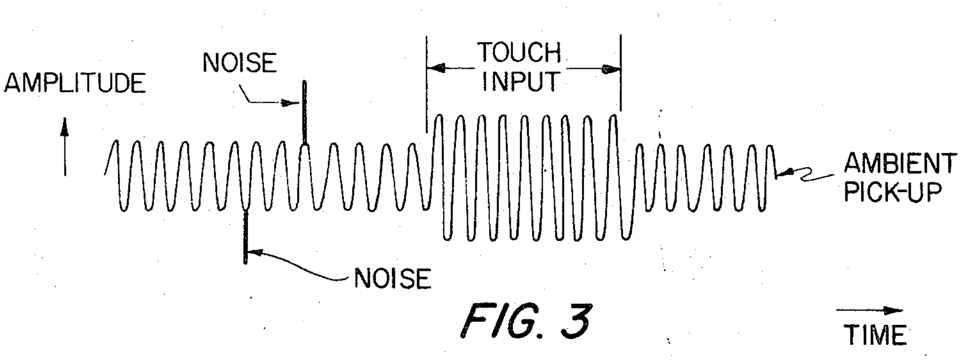
FIG. 3 is a waveform illustrating a hum pickup signal and an abrupt increase in amplitude of the signal as a result of a touch input to the touch receptors.

Referring to FIG. 3, the hum pickup input signal for operation of the touch control switch circuits of the present invention is shown. In the absence of a touch input to the circuitry, an ambient 60 Hz signal is generally present at the input along with occasional bursts of noise. A touch input to the circuitry results in an abrupt and sustained increase in the amplitude of the 60 Hz signal. A typical touch input has a minimum duration of one-half (0.5) second. The touch input signal is clearly distinguishable from both the noise and ambient signals because, in comparison with the ambient signal, the touch-induced signal abruptly changes the level of the input voltage while, in comparison with noise, the touch induced signal changes relatively slowly. Thus, to eliminate noise bursts and to distinguish the touch-induced signal from the background hum, the circuits have two filtering requirements: (1) low pass filtering to eliminate noise signals, and (2) filtering to pass only the relatively short duration voltage changes associated with the touch input.

In addition, the circuits incorporate automatic sensitivity control to maximize the amplitude of desired signals, to minimize the required dynamic operating range of the circuitry, and to accommodate variations of certain components and ambient conditions without manual adjustment. An advantage of automatic sensitivity control is that the detector circuits can be used to sense subsequent touch inputs even if a previous touch input is maintained.

Figure 1:
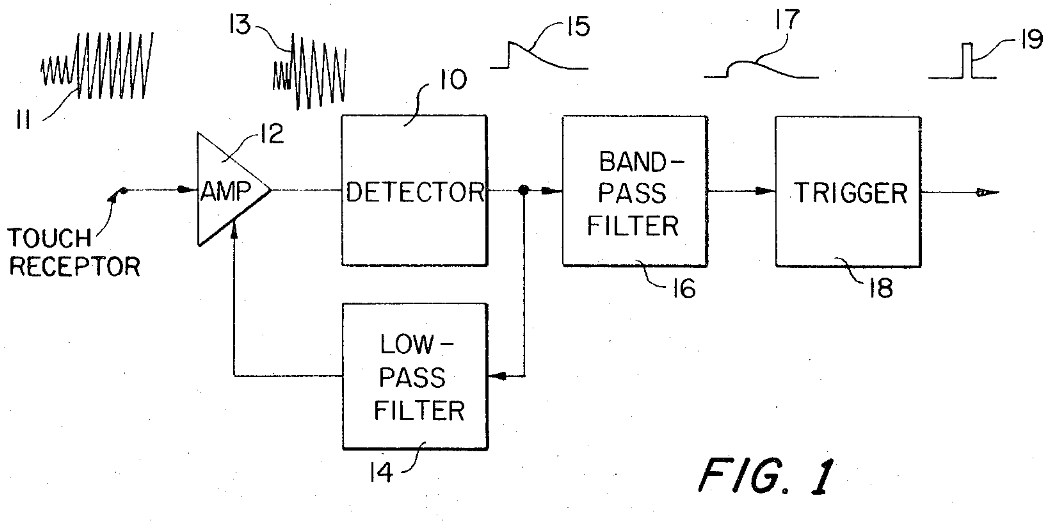
FIG. 1 is a block diagram of a touch control switch circuit comprising a touch receptor a detector, a feedback path including a low pass filter, and a band pass filter constructed in accordance with the principles of the present invention.

The touch control switch circuit of the present invention comprises detecting means responsive to the oscillating signal for producing an output to indicate the increase in the amplitude of the oscillating signal. In the embodiment of FIG. 1, the detecting means includes a detector circuit 10 and a variable gain amplifier 12 having an input responsive to the hum pickup signal (waveform 11) from a touch receptor and an output coupled to the detector circuit. The output signal produced by amplifier 12 in response to an abrupt and sustained increase in the hum pickup signal is illustrated by waveform 13. Detector circuit 10 produces an output signal (waveform 15) corresponding to the envelope of the amplifier output.

The touch control switch circuit also includes a feedback path including a low pass filter responsive to the output of the detecting means for controlling the sensitivity of the detecting means to the oscillating signal. As shown in FIG. 1, a low pass filter 14 is provided. The filter provides feedback from the output of detector 10 to variable gain amplifier 12 to decrease the gain of the amplifier in response to an increase in the detector output (waveform 15). The feedback results in a gradual decrease in the signal (waveform 13) produced by amplifier 12 with a corresponding decrease in the detector output (waveform 15).

Low pass filter 14 has an associated time delay that determines its response to changes in the level of the input signal. The filter can be designed to have a relatively long time delay in comparison with the duration of the touch input so that only a protracted increase in the level of the input signal, e.g., a prolonged increase in the ambient signal level, will result in a corresponding reduction in the gain amplifier 12 to compensate for the change in the ambient signal. Alternatively, the filter can be designed to have a time delay on the order of the duration of the touch input, e.g., 2 or 3 seconds, so that compensation for changes in the level of the input signal will occur during the touch input. In this case, the detector circuit will be capable of responding to a subsequent touch input even if a previous touch input is maintained.

The touch control switch circuit further includes filtering means responsive to the output of the detecting means for eliminating undesired frequency components from the output of the detecting means. Referring to FIG. 1, a band pass filter 16 is provided to perform post detection filtering on the output of detector 10. The output of band pass filter 16 (waveform 17) is applied to a trigger circuit 18, e.g., a Schmitt trigger, for producing an output signal (waveform 19) to operate a desired electronic device (not shown).

Figure 2:
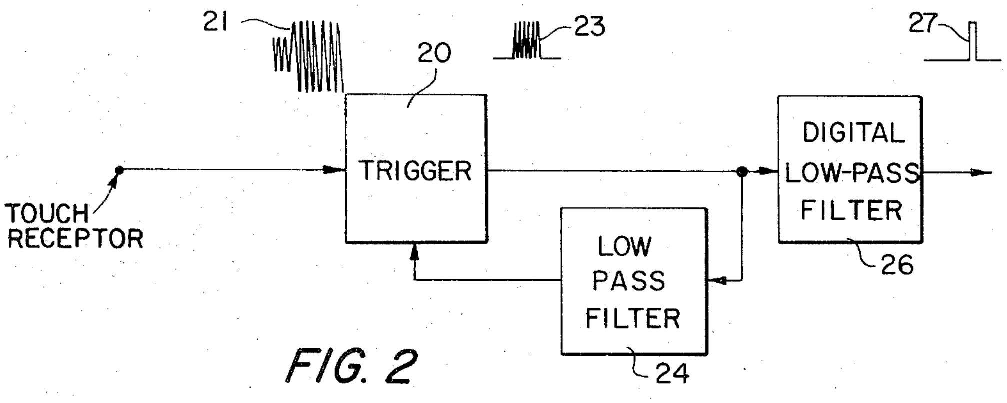
FIG. 2 is a block diagram of a touch control switch circuit comprising a touch receptor a trigger circuit, a feedback path including a low pass filter, and a digital low pass filter constructed in accordance with the principles of the present invention.

In the embodiment of the touch control switch circuit shown in FIG. 2, the detecting means is embodied as a trigger circuit 20 having a variable threshold. The trigger circuit is responsive to the hum pickup signal (waveform 21) from the touch receptor and provides an output signal comprising a series of pulses (waveform 23) in response to an abrupt and sustained increase in the amplitude of the hum pickup signal resulting from a touch input. A feedback path including a low pass filter 24 is coupled to the output of trigger circuit 20 to control the threshold of the trigger circuit to decrease the sensitivity of the trigger circuit to the hum pickup signal upon the occurrence of a protracted increase in its amplitude. The filter means of this embodiment comprises a digital low pass filter 26 coupled to the output of trigger circuit 20. The digital filter produces an output pulse (waveform 27) upon the occurrence of a predetermined number of sequential output pulses from the trigger circuit.

Figure 4:
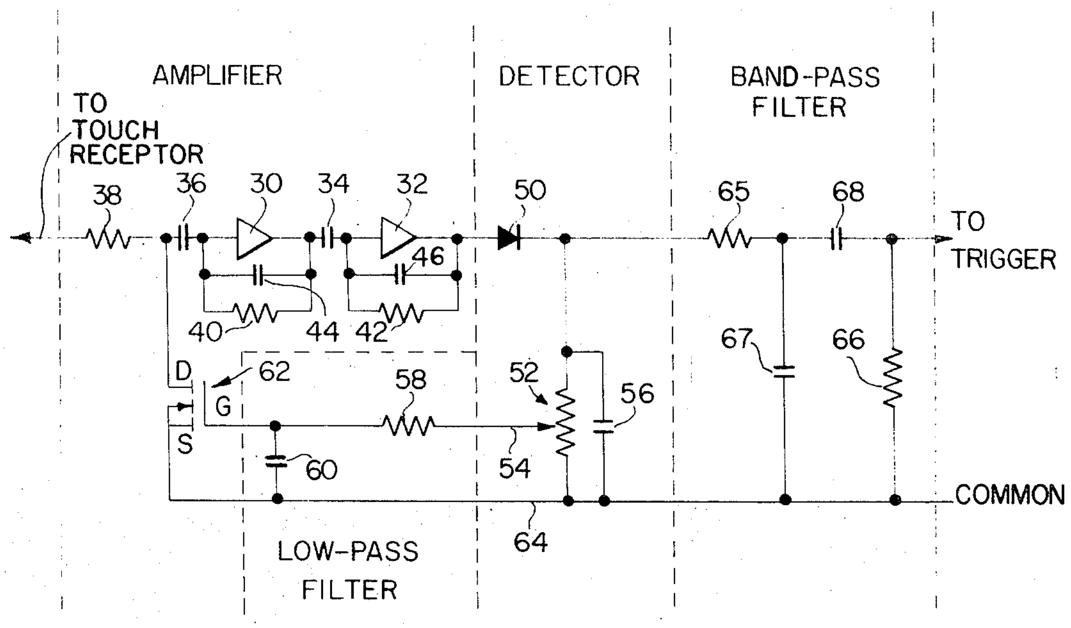
FIG. 4 is a schematic diagram illustrating in detail the components of a detector circuit constructed according to FIG. 1.
Figure 4A:
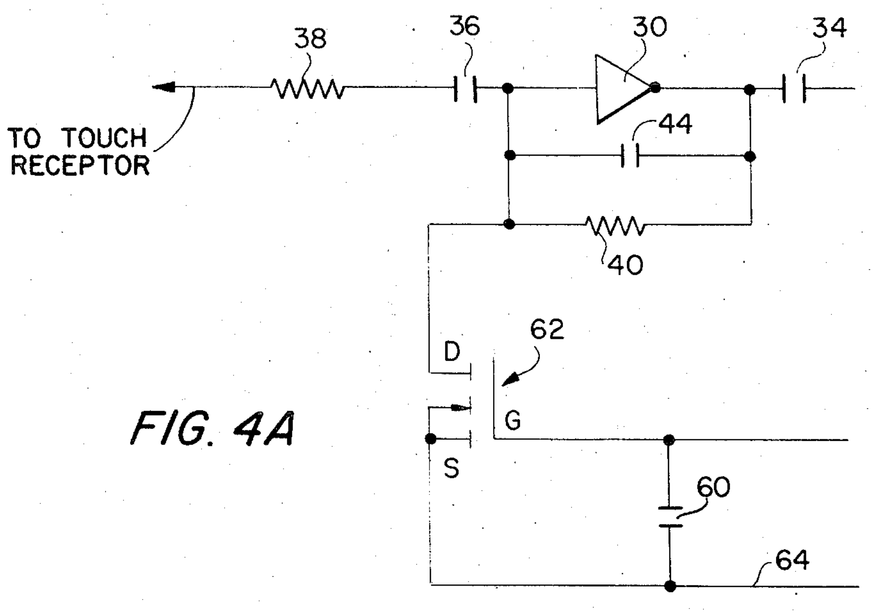
FIG. 4A illustrates an alternative circuit arrangement for the detector circuit of FIG. 4.
Figure 5:
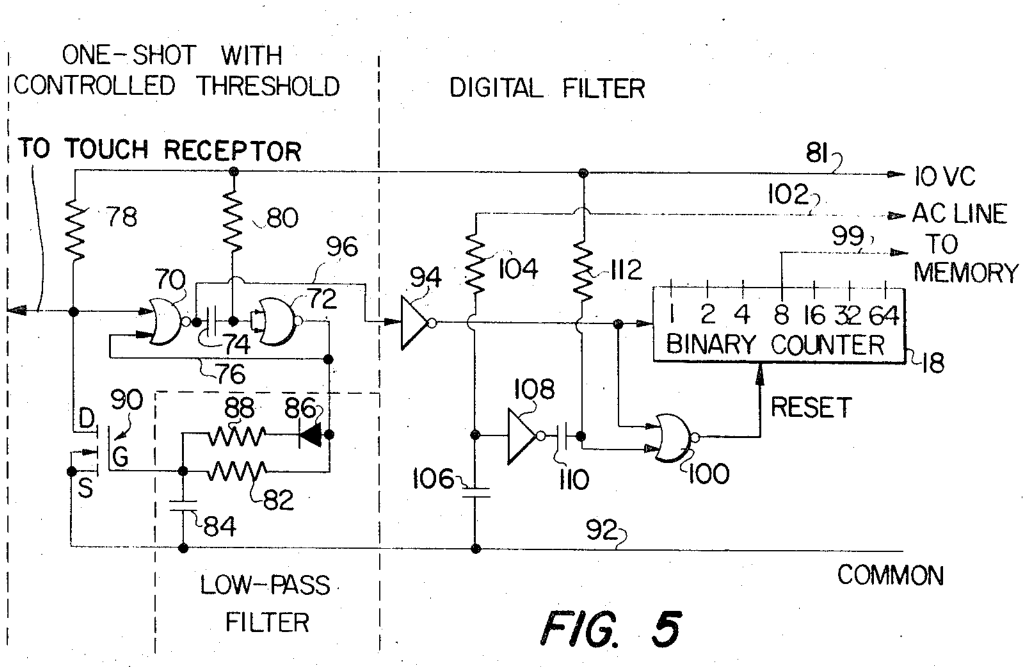
FIG. 5 is a schematic diagram illustrating the components of a detector circuit constructed according to FIG. 2.
Figure 6:
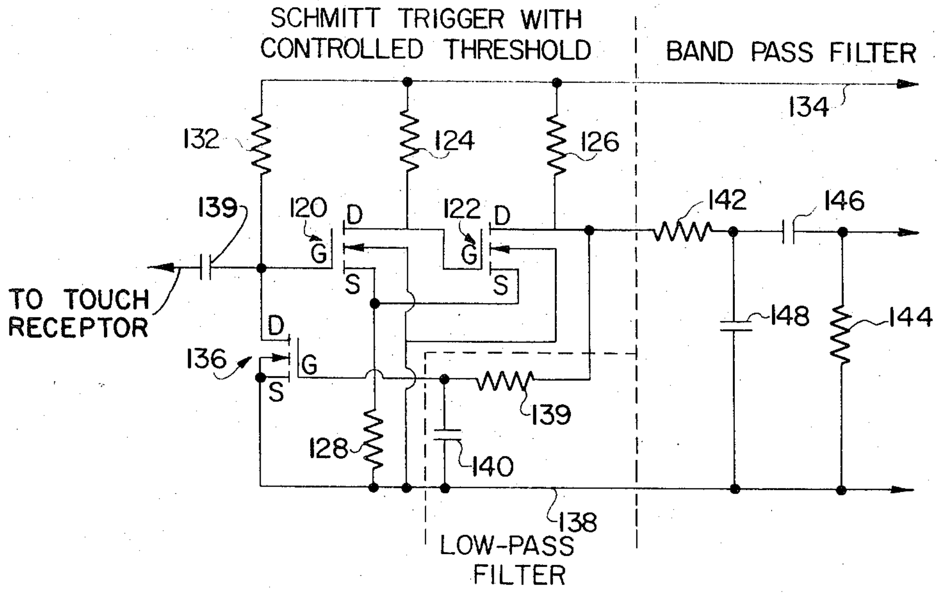
FIG. 6 is a schematic diagram of an alternative embodiment of the detector circuit of FIG. 2.

The detector circuits of FIGS. 4–6 are designed in accordance with the same principles broadly embodied in the circuitry of FIGS. 1 and 2. These circuits utilize complementary symmetry metal oxide semiconductor (COS/MOS) integrated circuits. Although other types of integrated circuits, or discrete transistors, can be used to achieve the same results, the COS/MOS integrated circuits are convenient because these circuits exhibit extremely high input impedance and extremely low power consumption. The COS/MOS integrated circuits are used in the amplifier circuit of FIGS. 4 and 4A, the trigger circuits of FIGS. 5 and 6, and the digital filter of FIG. 5.

FIG. 4 illustrates a detector circuit constructed in accordance with the circuit arrangement and function of the circuit broadly disclosed in FIG. 1. In FIG. 4, the trigger portion is not shown, however, because it is not the subject of the present invention.

In the detector circuit of FIG. 4, a touch input is applied to a two-stage linear amplifier comprising a pair of COS/MOS inverters or amplifiers 30 and 32 interconnected by a coupling capacitor 34. An input capacitor 36 is provided at the input of inverter 30. A resistance 38 couples a touch input receptor (not shown) to capacitor 36. Biasing resistors 40 and 42 are connected across inverters 30 and 32, respectively, to provide linear biasing of the inverters. Shunt capacitors 44 and 46 are connected in parallel with resistors 40 and 42, respectively.

The linear biasing of COS/MOS amplifiers 30 and 32 provided by resistors 40 and 42 is a standard practice in the operation of COS/MOS amplifiers. Linear biasing requires the connection of a very high resistance between the input and the output terminals of the inverter so that, with no input signal applied, the inverter operates with equal input and output voltages. Under this condition, the inverter is at the mid-point of its switching characteristic, and a small deviation of the input voltage in either direction will result in a large deviation in the output voltage in the opposite direction. In the case of each of the inverters 30 and 32 of the linear amplifier, the input signal is applied through an input capacitor. Thus, as long as the input signal changes relatively rapidly, the instantaneous voltage across the capacitor will be only slightly effected by resulting excursions of the output voltage from the quiescent condition of the inverter.

As shown in FIG. 4, the output of inverter 32 is applied to a detector circuit comprising a diode 50 connected in series with an RC circuit including a potentiometer 52 having a variable tap 54 and a capacitor 56 connected in parallel with the potentiometer. It should be noted that resistors of fixed value can be used in place of potentiometer 52.

A low pass RC filter comprising a resistor 58 and a capacitor 60 and a field effect transistor 62 are provided in a feedback path extending from tap 54 of potentiometer 52. The values of resistor 58 and capacitor 60 are selected to provide a desired time delay as explained above. The output of the low pass filter is applied to gate electrode G of field effect transistor 62. Drain electrode D of transistor 62 is coupled to the input of amplifier 30 through capacitor 36 and source electrode S of the transistor is coupled to a common or ground conductor 64.

The output of the detector circuit provided by diode 50 is applied to an RC band pass filter comprising a pair of resistors 65 and 66 and a pair of capacitors 67 and 68. The output of the band pass filter is coupled to a trigger circuit (not shown).

In operation, amplifiers 30 and 32 of FIG. 4 provide a low frequency response to signals below the 60 Hz hum pickup signal and, at even lower frequencies, negative feedback through biasing resistors 40 and 42 reduces the response until it is zero at zero frequency. Resistors 40 and 42 are by-passed by small capacitors 44 and 46 which attenuate the undesirable response at frequencies substantially above 60 Hz.

Input resistor 38 is relatively large, e.g., 22 megohms, and together with field effect transistor 62, provides an input voltage divider. The source to drain impedance of the field effect transistor is very high (e.g., hundreds or thousands of megohms) in the absence of an input voltage at its gate electrode, but the impedance drops rapidly after the gate voltage rises above a threshold of a few volts. As a result, the fraction of the input voltage applied to the remainder of the amplifier circuit decreases from approximately full value to approximately zero.

The gate voltage for field effect transistor 62 is derived from the detector output through the low pass filter. Thus, in the event of a touch input, any change in the input voltage to the amplifier is eventually compensated by readjustment of the input voltage divider as a result of feedback of the detector output through the low pass filter. Upon the occurrence of a touch input, the amplifier and detector output voltages will be increased as a result of the touch input.

The band-pass filter attenuates very short duration detector outputs in comparison with detector outputs resulting from intentional touch inputs of a few tenths of a second in duration. Thus, the band-pass filter eliminates undesired frequency components from the output of the detector circuit.

It should be noted that the variable voltage divider of FIG. 4 functions in the same manner as the gain control of a conventional amplifier. The voltage divider is not required to be located at the amplifier input and, if located elsewhere, the amplifier input impedance would not vary in resonse to touch input signals. In any event, the variation in amplifier input impedance is not significant because the minimum input impedance of 22 megohms provided by resistors 38 is large relative to the usual source impedance of the touch input. On the other hand, gain control is desirable in the amplifier circuit as early as possible to minimize the voltage excursion capability required.

FIG. 4A illustrates a variation of the basic circuit of FIG. 4 in which field effect transistor 62 is connected on the opposite side of input capacitor 36 of inverter 30. In this circuit configuration, the field effect transistor can effect amplifier bias as well as the fraction of the input signal applied to the amplifier. As the detector output increases in response to a touch input, the impedance of field effect transistor 62 decreases and the bias at the input of the first amplifier stage also decreases. The inverter thus moves to a lower gain portion of its transfer characteristic. With a further touch input, the resulting bias will be at a level below the threshold at which the amplifier stage produces output voltage changes in response to input voltage changes. Thus, only the positive peaks of the input signal will be amplified, detected, and applied as feedback to control the field effect transistor. Further increases in the touch input will also be compensated as the input voltage divider supplies a decreasing fraction of the input signal to the amplifier.

In the detector circuit of FIG. 5, a standard one-shot or monostable multivibrator is included in the detector circuit. The multivibrator comprises a pair of COS/MOS NOR gates 70 and 72. The output of NOR gate 70 is coupled by a capacitor 74 to the inputs of NOR gate 72. The output of NOR gate 72 is coupled by a conductor 76 to one of the inputs of NOR gate 70. Suitable bias resistors 78 and 80 connected to a power supply conductor 81 are provided for NOR gates 70 and 72, respectively.

In the quiescent state, the output of NOR gate 70 is high and the output of NOR gate 72 is low. When a touch input exceeding a threshold level is applied to the touch receptor (not shown), NOR gate 70 produces a low output. Coupling capacitor 74 applies the voltage change to the input of NOR gate 72 to drive the output of NOR gate 72 to a high level. The output of NOR gate 72 remains at the high level until current flow through resistor 80 raises the inputs of NOR gate 72 to the threshold level at which its output drops to a low level and drives the output of NOR gate 70 to its original high state.

The turn-on time of the multivibrator is selected so that the multivibrator is triggered during positive half-cycles of the AC touch input signal and returns to its stable state during subsequent negative half-cycles of the touch input. Thus, as long as a touch input of adequate amplitude is present, the multivibrator will produce a series of rectangular pulses at a rate of 60 per second. The amplitude and duration of the pulses are independent of the amplitude of the touch input.

As shown in FIG. 5, the output of the multivibrator is applied to a low pass RC filter comprising resistor 82 and capacitor 84. In addition, a diode 86 and resistor 88 are connected to capacitor 84 in parallel with resistor 82. The output of the low pass filter at the junction between resistor 82 and capacitor 84 is applied to gate electrode G of a field effect transistor 90 having its drain electrode D connected to the input of the monostable multivibrator and its source electrode S connected to a common or ground conductor 92.

When the output of the multivibrator, i.e., the output of NOR gate 72, is high, capacitor 84 is charged through diode 86 and resistor 88. When, on the other hand, the output of the multivibrator is low, capacitor 84 discharges through resistor 82 which is substantially larger than resistor 88. Initially, a series of output pulses from the multivibrator will progressively charge capacitor 84 resulting in a decrease in the bias voltage on the trigger terminal of the multivibrator. As a result, the input trigger threshold, which must be exceeded by the AC touch input to trigger the multivibrator, will increase until the triggering of the multivibrator eventually terminates. Thereafter, the charge on capacitor 84 will gradually decrease until triggering of the multivibrator occurs. In view of the difference between the charge and discharge rates of capacitor 84, the multivibrator will be inhibited for an extended time period after charging of capacitor 84.

The output applied to the digital filter is derived from NOR gate 70 through an inverter 94 coupled to the output of the NOR gate by a conductor 96. The output of inverter 94 is applied to the digital filter which responds only to an uninterrupted train of several pulses. The required train of pulses is produced only by an intentional touch input of sufficient amplitude and duration to operate the detector circuit.

The principle component of the digital low pass filter is a binary counter 98. The binary counter is provided with a plurality of outputs, designated 1, 2, 4, 8, 16, 32 and 64, which provide output signals after the occurrence of predetermined minimum numbers of pulses from inverter 94. As shown in FIG. 5, at least one output line, e.g., line 99, can be connected to a selected output terminal of the binary counter to operate a memory device (not shown).

The digital filter includes a NOR gate 100 having a first input coupled to the output of inverter 94 and a second input responsive to signals on an AC line 102. The output of NOR gate 100 is coupled to a reset terminal of binary counter 98. Ordinarily, inverter 94 produces a low output and the AC signal on line 102 is passed through an RC phase lag network comprising a resistor 104 and a capacitor 106, an inverter 108, and an RC differentiator comprising a capacitor 110 and resistor 112 to the second input of NOR gate 100 to reset the binary counter. During the train of pulses from the multivibator, however, the output of NOR gate 100 is maintained at a zero level. As a result, the binary counter cannot be reset until the train of pulse inputs is interrupted during at least one cycle of the signal on the AC line.

If the uninterrupted train of output pulses from the multivibrator has a sufficient duration (e.g., eight pulses), the binary counter will reach the minimum count required to produce a binary output signal on line 99 to operate the memory. Thus, the detector circuit of FIG. 5 does not require a separate trigger circuit to produce a binary output for driving the memory (as in the case of the detector circuit of FIG. 4) because it develops a binary output in its normal operation.

The binary counter of the detector circuit of FIG. 5 facilitates discrimination between touch inputs of different durations which will produce different minimum counts. Thus, a plurality of output lines can be connected to the output terminals of binary counter 98 to respond to the touch inputs of different durations.

In the detector circuit of FIG. 6, the detector comprises a Schmitt trigger including a pair of field effect transistors 120 and 122. Appropriate biasing resistors 124 and 126 are connected to drain electrodes D of field effect transistors 120 and 122, respectively. A common resistor 128 connects source electrode S of the field effect transistors to a common or ground conductor 138. The threshold of the Schmitt trigger is controlled by a variable voltage divider comprising a resistor 132 connected between a power supply conductor 134 and gate electrode G of transistor 120 and a field effect transistor 136 having its drain electrode D connected to gate electrode G of transistor 120 and its source electrode S connected to common or ground conductor 138 Gate electrode G of transistor 120 is coupled by a capacitor 139 to the touch receptor (not shown).

A feedback path including a low pass filter responsive to the output of the Schmitt trigger circuit is provided to control the operation of field effect transistor 136. The low pass filter comprises a resistor 139 and a capacitor 140 connected in series between drain electrode D of transistor 122 and common or ground conductor 138. The junction of resistor 139 and capacitor 140 is coupled to gate G of transistor 136.

The output of the Schmitt trigger circuit is applied to an RC band pass filter comprising a pair of resistors 142 and 144 and a pair of capacitors 146 and 148.

In the operation of the detector circuit of FIG. 6, in the absence of a touch input, hum pickup will switch the trigger circuit on, but only for a small fraction of each cycle of the input signal, i.e., during the peak of its positive excursion. Upon the occurrence of a touch input, the input signal amplitude will abruptly increase and the positive excursion will exceed the trigger threshold for a longer time (up to one-half cycle) so that the output pulses produced by the trigger circuit will be longer in duration. As a result, the average output voltage will increase toward a level of one-half of the supply voltage. Once the higher output voltage propagates through the low pass filter in the feedback path, the DC bias on the trigger will decrease, the AC input threshold will increase, and the duty cycle of the trigger output will decrease until equilibrium is re-established. The output of the trigger circuit is passed through the band pass filter to allow only inputs of a predetermined duration, e.g., a few tenths of a second, to pass with minimum attenuation. The output of the band pass filter is applied to a trigger circuit (not shown) to complete the operation of the touch control switch circuitry.

The invention in its broader aspects is not limited to the specific details shown and described, and modifications may be made in the details of the touch control switch circuit without departing from the principles of the present invention.

What is claimed is:

1. A touch control switch circuit for detecting a touch input applied to the circuit, comprising:

a touch receptor operable by electrical contact with a human body for producing an oscillating signal which increases in amplitude in response to a touch input applied to said receptor;

detecting means responsive to the oscillating signal for producing an output to indicate the increase in the amplitude of the oscillating signal;

a feedback path including a low pass filter responsive to the output of said detecting means for controlling the sensitivity of said detecting means to the oscillating signal; and means responsive to the output of said detecting means for eliminating undesired frequency components from the output of said detecting means to produce a signal indicating the occurrence of the touch input.

2. The touch control switch circuit of claim 1, wherein:

said detecting means comprises a detector circuit and a variable gain amplifier having an input responsive to the oscillating signal and an output coupled to said detector circuit; and said feedback path is coupled to said amplifier to control the gain of said amplifier to decrease the sensitivity of said detecting means to the oscillating signal upon the occurrence of a protracted increase in its amplitude.

3. The touch control switch circuit of claim 1, wherein:

said detecting means comprises a trigger circuit having a variable threshold; and said feedback path is coupled to said trigger circuit to control the threshold of said trigger circuit to decrease the sensitivity of said trigger circuit to the oscillating signal upon the occurrence of a protracted increase in its amplitude.

4. A touch control switch circuit operable by an increase in a hum pickup signal resulting from a touch input, comprising:

a touch receptor for producing a hum pickup signal of ambient magnitude in the absence of the touch input and an oscillating signal of increased amplitude upon the occurrence of the touch input;

a detector having an input responsive to the hum pickup signal from said touch receptor and an output for producing an output signal to indicate the occurrence of an increase in the amplitude of the hum pickup signal;

a feedback path including a low pass filter responsive to the output of said detector and a variable shunt coupled to the input of said detector and controlled by said low pass filter for diverting a portion of the hum pickup signal from the input of said detector to decrease the sensitivity of the detector upon the occurrence of a protracted increase in the hum pickup signal; and filtering means responsive to the output of said detector for eliminating undesired frequency components from the output signal of said detector to produce a signal indicating the occurrence of the touch input.

5. The circuit of claim 4, wherein said detector includes:

an amplifier circuit responsive to the hum pickup signal from said touch receptor; and a diode coupled to the output of said amplifier for detecting the hum pickup signal and producing an output signal corresponding to the detected envelope of the hum pickup signal.

6. The circuit of claim 5, wherein said filtering means comprises a band pass filter coupled to the output of said diode.

7. The circuit of claim 4, wherein said variable shunt comprises:

a variable impedance element coupled to the input of said detector and controlled by the output of said low pass filter for diverting a portion of the hum pickup signal from the input of said detector determined by the output signal produced by said detector.

8. The circuit of claim 7, wherein said variable impedance element comprises:

a field transistor having its gate electrode coupled to the output of said low pass filter, its drain electrode coupled to the input of said detector, and its source electrode coupled to ground.

9. A touch control switch circuit operating in response to an increase in a hum pickup signal resulting from a touch input, comprising:

a touch receptor for producing a hum pickup signal of ambient magnitude in the absence of the touch input and a hum pickup signal of increased magnitude upon the occurrence of the touch input;

a variable threshold trigger circuit having an input responsive to the hum pickup signal from said touch receptor and an output for producing a series of output pulses in response to the touch input;

a feedback path including a low pass filter responsive to the output of said trigger circuit;

a voltage divider coupled to the input of said trigger circuit, said voltage divider including a variable impedance element operative in response to the output of said low pass filter to increase the threshold of said trigger circuit upon the occurrence of a protracted increase in the hum pickup signal; and filtering means responsive to the output of said trigger circuit for producing an output signal to indicate the occurrence of a touch input of a predetermined duration.

10. The circuit of claim 9, wherein said variable impedance element comprises:

a field effect transistor having its gate electrode coupled to the output of said low pass filter, its drain electrode coupled to the input of said trigger circuit, and its source electrode coupled to ground.

11. The circuit of claim 9, wherein:

said trigger circuit comprises a monostable multivibrator; and said filtering means comprises a digital filter including a binary counter responsive to the output pulses produced by said monostable multivibrator for producing a pulse output upon the occurrence of a predetermined number of pulses from said monostable multivibrator.

12. The circuit of claim 9, wherein:

said trigger comprises a Schmitt trigger; and said filtering means comprises a band pass filter coupled to the output of said Schmitt trigger.

* * * * *

UNITED STATES PATENT OFFICE
CERTIFICATE OF CORRECTION

Patent No. 3,784,848 Dated January 8, 1974

Inventor(s) William F. Hamilton, II

It is certified that error appears in the above-identified patent and that said Letters Patent are hereby corrected as shown below:

Claim 8, column 10, line 33, after "field" insert --effect--.

Signed and sealed this 21st day of May 1974.

(SEAL)
Attest:

EDWARD M.FLETCHER,JR.
Attesting Officer

C. MARSHALL DANN
Commissioner of Patents